Nov. 5, 1968  F. BAUER  3,408,835
COMBINATION SAFETY LOCK
Filed July 7, 1967  6 Sheets-Sheet 1

INVENTOR.
FRANZ BAUER
BY Karl F. Ross
Attorney

Nov. 5, 1968

F. BAUER 3,408,835

COMBINATION SAFETY LOCK

Filed July 7, 1967

INVENTOR.
FRANZ BAUER

BY Karl G. Ross
Attorney

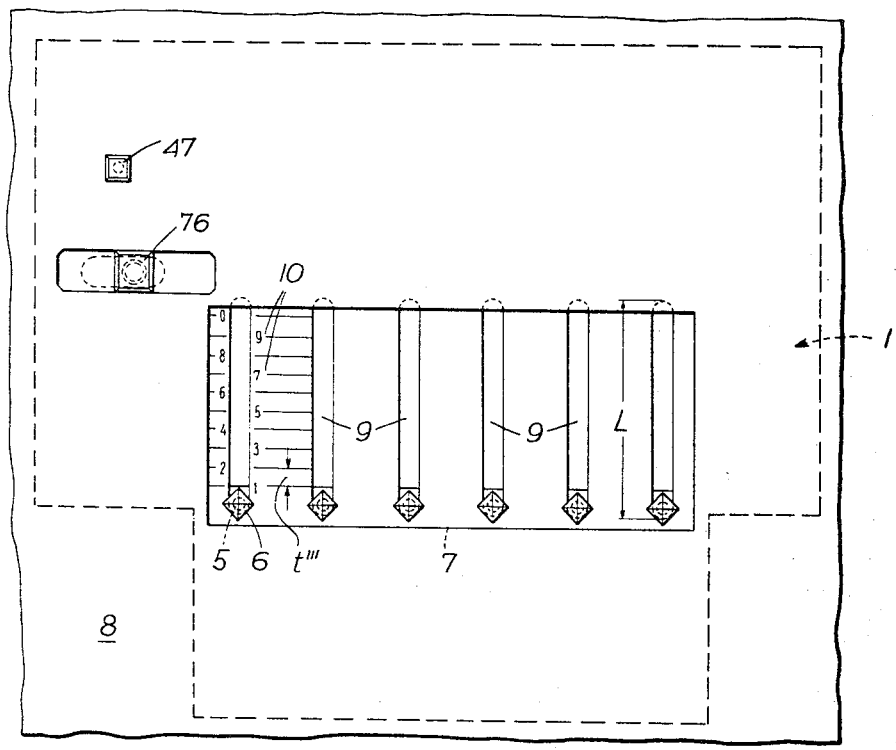
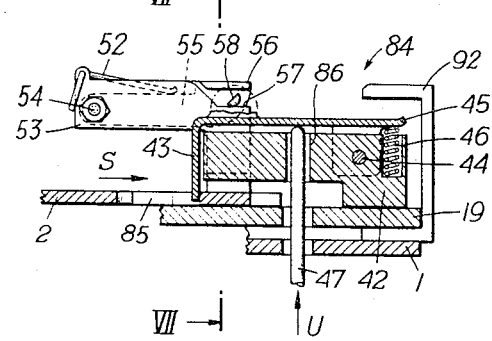
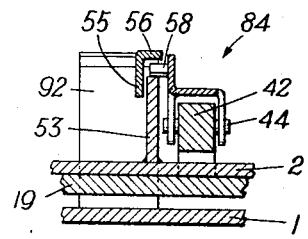

Nov. 5, 1968  F. BAUER  3,408,835
COMBINATION SAFETY LOCK
Filed July 7, 1967  6 Sheets-Sheet 4
FIG. 10
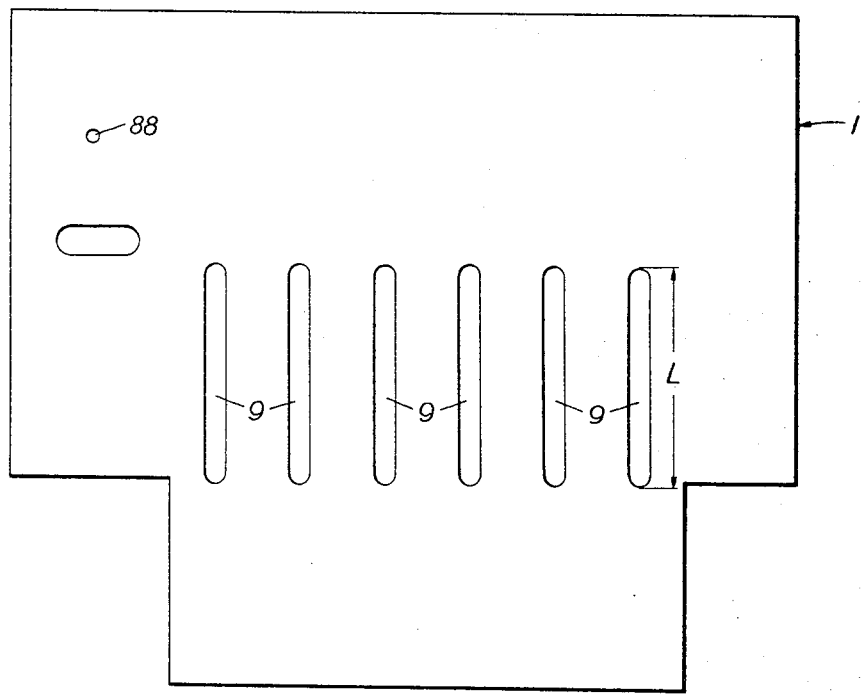
FIG. 11
FIG. 12
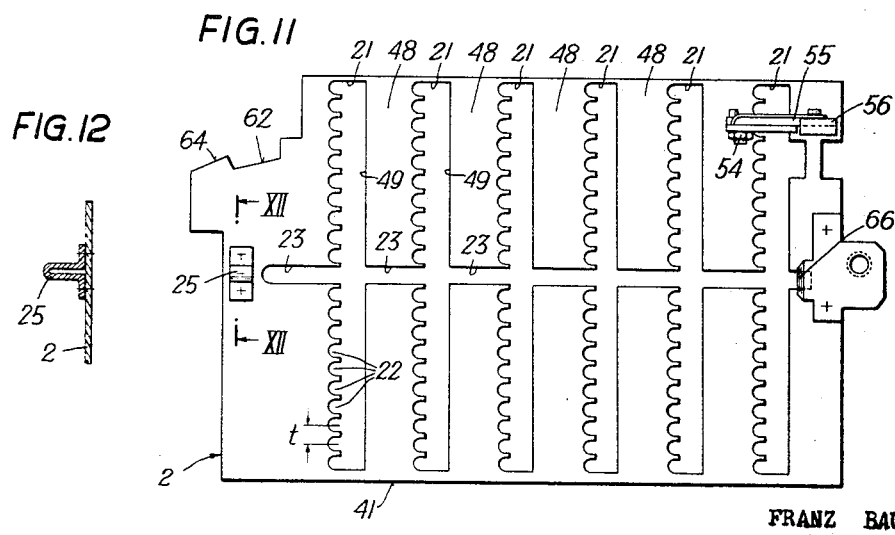
FRANZ BAUER
INVENTOR.
BY Karl G. Ross
Attorney

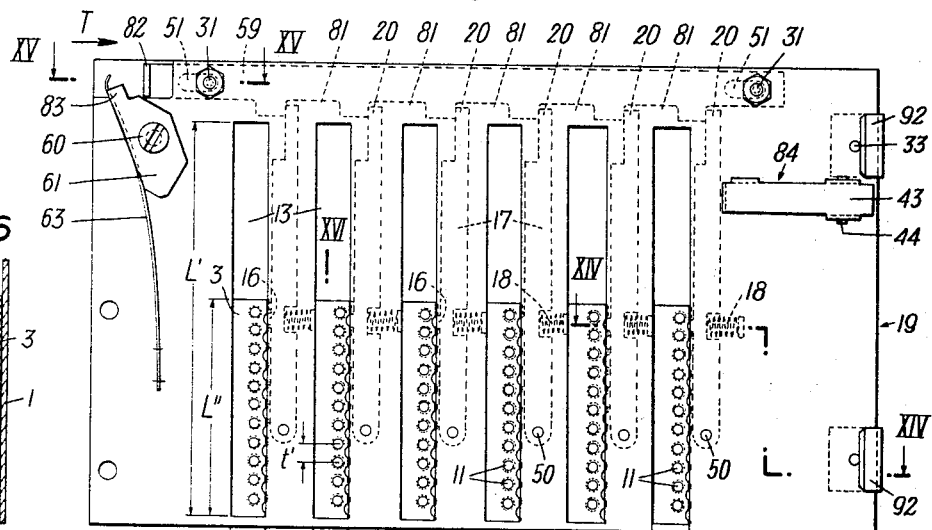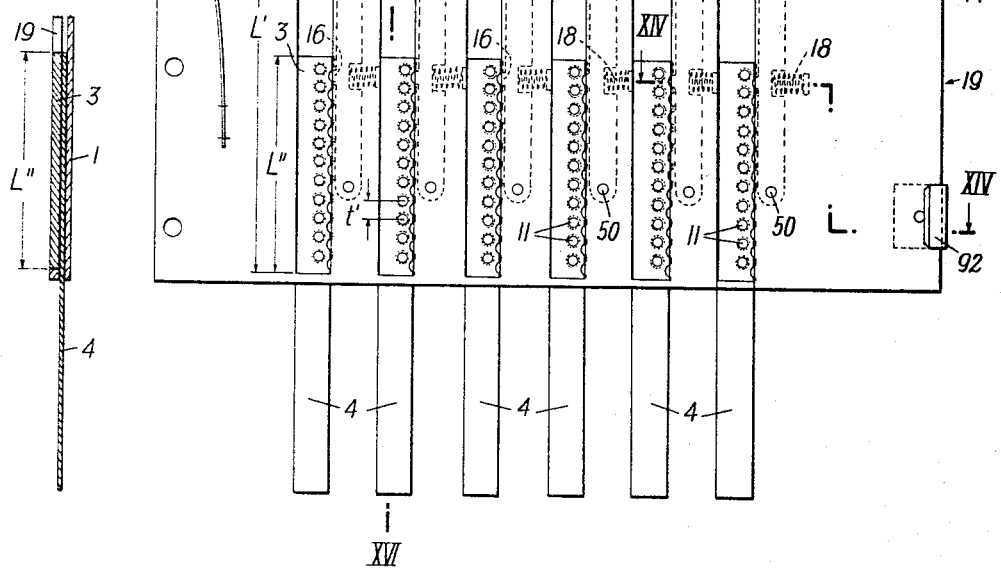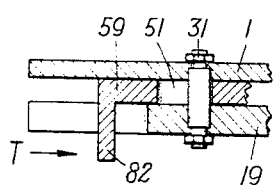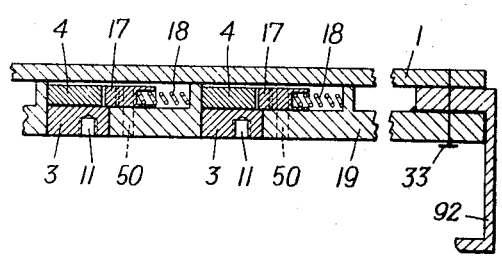

Nov. 5, 1968   F. BAUER   3,408,835
COMBINATION SAFETY LOCK
Filed July 7, 1967   6 Sheets-Sheet 6

FRANZ BAUER
INVENTOR.

BY *Karl G. Ross*
Attorney

United States Patent Office 3,408,835
Patented Nov. 5, 1968

3,408,835
COMBINATION SAFETY LOCK
Franz Bauer, Porzellangasse 53/4, Vienna 9, Austria
Filed July 7, 1967, Ser. No. 651,896
10 Claims. (Cl. 70—156)

ABSTRACT OF THE DISCLOSURE

A cover plate is provided with a plurality of parallel apertures and with a plurality of series of marks spaced along each of said apertures. A slide plate is substantially parallel to and laterally spaced from said cover plate and has a plurality of openings, which are substantially parallel to said apertures, lands between said openings, and a slot, which intersects said openings. A guide plate is disposed between and substantially parallel to said cover and slide plates and fixed to the cover plate and provided with a plurality of guides, which are parallel to each other and substantially parallel to said openings and apertures. A plurality of sliders are provided, each of which is slidably mounted in one of said guides. A plurality of setting handles are provided, each of which is mounted on one of said sliders and extends through one of said apertures. Each of said sliders is provided on its side remote from said cover plate with a series of holes, which are spaced apart by the same distances and in the same direction as said marks alongside the aperture through which the setting handles mounted on the slider extends. A pin is fitted in a single hole of each of said series of holes and extends into one of said openings. A bolt is slidably mounted in a bolt guide, which extends parallel to said slot, and said bolt is adapted to be coupled to said slide plate for movement along said bolt guide. Each of said sliders is movable along said guides in said guide plate to an unlocking position, in which said pin in said slider extends into said slot. Said slide plate is movable in the direction of said slot when, and only when, all said sliders are in said unlocking position.

This invention relates to a combination safety lock.

An object of the invention resides in the provision of a safety lock in which the combination which must be set to enable the lock to be opened can be changed as desired and without a large expenditure so that a high degree of safety against an unauthorized opening of the lock is provided.

This is accomplished in that a number of sliders are provided, which are slidable parallel to each other along guides provided on a plate, each of said sliders is provided on its outside with a boltlike handle, the sliders are slidable beside line marks provided on a cover plate and having preferably inscriptions consisting, e.g. of the digits 1 to 0, each of said sliders has at its rear side, opposite to said boltlike handle, a series of superimposed holes, any hole of the series of holes of each slider is adapted to receive a pin, which extends through an aperture formed in a slide plate, which is movable transversely to the guides for the sliders, said aperture is parallel to the guides for the sliders, said slide plate is provided with a transverse slot, which extends through the lands between the apertures in the slide plate, said slide plate is connected to the bolt of the lock by a driver so that the slide plate is movable transversely to the direction of movement of the sliders when all sliders are in a position in which the pins lie before the junctions where the transverse slot opens into the recesses.

It is another object of the invention to ensure that the operation of an alarm device or the like will be initiated in response to an attempt to change a previously set character combination after an attempt has been made to move the lock to its open position.

According to a development of the invention this object is accomplished in that each aperture in the slide plate has a notched edge, the number of notches in the edge is twice the number of characters to which the boltlike handle of each slider is adjustable, the plate provided with the guides for the sliders is provided, if desired, with a hook, which is pivotally urged against the slide plate by the action of a spring, and after a displacement of the slide plate from its locking position falls into a recess in the slide plate to prevent a return movement of the slide plate to its position of rest, an arm is secured to the slide plate and has a camming edge, which is inclined relative to the slide plate, a driver pin firmly connected to the hook slides along the hook and moves the latter out of the recess in the slide plate when the latter is moving to its unlocking position, a one-armed lever is pivoted to the arm and has a lug adjacent to its end remote from the pivotal axis, said lug overlies the camming edge and is under the action of a spring, which tends to move the lug against the camming edge, and to prevent, during a movement of the slide plate from the unlocking position to the locking position, a sliding movement of the driver pin along that portion of the camming edge which is inclined from the slide plate and an engagement of the hook with the recess of the slide plate.

It is also an object of the invention to enable a correction of a wrong character combination setting when the operation of an alarm device has been initiated.

This is accomplished in that the hook can be lifted out of the recess of the slide plate by means of a pin, which is connected to an alarm device, so that after a movement of the slide plate through a part of the total displacement, from the locking position to an intermediate position, in which the pin engages the bottom of a notch, the slide plate returns to its locking position under the action of a spring which acts on the bolt of the lock, and the pins are disengaged from the notches of the slide plate when the latter is in said locking position.

It is a further object of the invention to facilitate the access to the sliders so that the position of the pins which determines the character combination which enables an opening of the lock can easily be altered.

This is accomplished in that the bolt is guided in a boxlike housing portion, which is adapted to be applied to the lock and to be hooked onto retaining members, which are fixed to the plate for guiding the sliders.

It is an additional object of the invention to prevent an opening of the door at certain times from the inside of the room when the bolt engages the recess in the doorpost. This is accomplished in that the bolt is firmly connected to a sliding member, which is slidable in guides, which are secured in the housing cover, the sliding member is connected to a rotatable actuating handle, which extends through a slot, which is formed in the housing cover and extends in the direction of movement of the bolt, and said handle is connected inside the housing cover to an angle member, which is pivotally movable by a rotation of the actuating handle and adapted to assume a position in which the free arm of the angle member is at right angles to the direction of movement of the bolt and in this position engages a stop, which is fixed to the slide plate, so that the actuating handle and with it the bolt are then slidable only in unison with the slide plate.

The invention will be explained more fully hereinafter with reference to an embodiment shown by way of example in the drawing, in which FIG. 1 is a perspective view showing a safety lock according to the invention, which is fitted in a door, the lock being shown from the inside when the door is open.

FIG. 5 is an elevation showing part of the door viewed from the outside of the room to be closed by the door.

FIG. 6 is a sectional view taken on line VI—VI of FIG. 3 on a larger scale than in FIG. 3.

FIG. 7 is a sectional view taken on line VII—VII in FIG. 6.

FIG. 10 is a top plan view showing a detail of FIG. 3.

FIG. 11 is a top plan view showing another detail of FIG. 3.

FIG. 12 is a sectional view taken on line XII—XII in FIG. 11.

FIG. 13 is a top plan view showing another detail of FIG. 3.

FIG. 14 is a sectional view taken on line XIV—XIV of FIG. 13 on a larger scale than in FIG. 13.

FIG. 15 is a sectional view taken on line XV—XV of FIG. 13 on a larger scale than in FIG. 15.

FIG. 16 is a sectional view taken on line XVI—XVI of FIG. 13.

Figure 1:
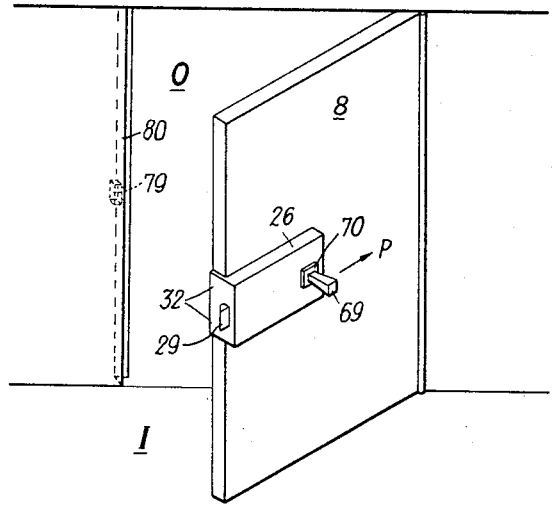
Figure 2:
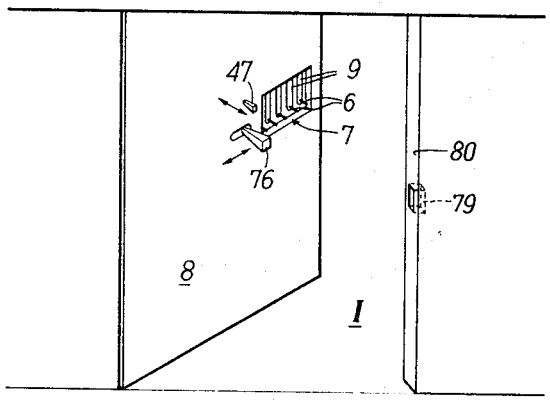
FIG. 2 is a perspective view showing a safety lock according to the invention fitted in a door, viewed from the outside of the room which is to be closed by the door.

FIGS. 1 and 2 show the mounting of the safety lock according to the invention on a door 8. The safety lock has a bolt 29, which engages a recess 79 in the doorpost 80 when the door is closed. When the door 8 is to be opened from the outside O of the room which is closed by the door 8, boltlike handles 6, which are slidable in slots 9, must be moved to predetermined positions, which will be explained hereinafter. An actuating handle 76 is then displaced (to the left in FIG. 2) to move the bolt 29 out of the recess 79 in the doorpost 80 and to enable an opening of the door 8.

If the door is to be opened from the inside I of the room, a handle 69 will be pulled in the direction of the the arrow P in FIG. 1, whereby the bolt 29 is also moved out of the recess 79 in the doorpost 80 and enables an opening of the door 8. The handle 69 may be actuated independently of the position of the boltlike handles 6 so that the door 8 can always be opened from the inside of the room. Alternatively, the arrangement may be such that the door can be opened only from the outside of the room, as will be explained hereinafter. In this case the actuating handle 76 must be displaced to the position in which the bolt 29 is retracted and the handle 69 is then pivotally moved through 90° from the position shown in FIG. 1.

Details of the lock according to the invention are shown in FIGS. 3 to 18.

As is apparent from FIGS. 3, 4, 13, 14 and 16, sliders 3 are slidably mounted in guide slots 13 formed in a guide plate 19. A face plate 4 is secured to the outside of each slider 3 and extends beyond the width of the slider. The face plates 4 associated with the sliders 3 engage a cover plate 1, which is parallel to the guide plate 19 and is non-displaceably connected to the guide plate 19, e.g., by means of bolts 31 and 33. The face plates 4 are thus disposed between the guide plate 19 and the cover plate 1 and prevent the sliders 3 from falling at right angles to the guide plate 19 out of the apertures 13. According to another embodiment, not shown, the apertures 13 in the guide plate 19 may be narrower than the sliders 3 or each aperture 13 may be provided on both sides with guide ledges for the slider 3. These guide ledges protrude from the rear side of the guide plate 19 against the cover plate 1 and the rear side of the sliders 3 extends parallel to the guide plate 19 and contacts the cover plate 1.

Each slider 3, particularly its face plate 4, has a bore 5, which is disposed on the side facing of the cover plate 1 and adapted to receive a boltlike handle 6, which extends outwardly through an elongated aperture 9 (FIGS. 5, 10) in the cover plate 1. The slot 9 is at least as long as one half of the length L' of the guide slot 13 in the guide plate 19 and is preferably longer. The length L'' of each slider 3 is one half of the length L' of the aperture 13 of the guide plate 19. In this way, each slider 3 can be displaced by means of the boltlike handle 6 from the outside of the room which is adapted to be closed by the door 8 in the direction of the aperture 13 of the guide plate 19. The embodiment shown by way of example comprises six sliders 3 and six boltlike handles 5. These sliders and bolts, respectively, are entirely alike. To indicate the distance by which each slider has been moved by the boltlike handles 6 from an initial position, ten line marks 10 are provided beside each elongated aperture 9 in the cover plate 1, as is shown in FIG. 5. These line marks are provided with digits from 1 to 0. As the illustrative embodiment comprises six sliders, as has been mentioned, they may be set to any number having six digits. The lock cannot be opened unless a single predetermined number is set, which is selected from the multiplicity of numbers having six positions. When this number is known only to the persons who are authorized to open the lock, that multiplicity of numbers affords a virtually absolute safety against an unauthorized opening of the door without a destruction of the door or of the lock. It will obviously be possible to provide less than six sliders 3 for less important purposes. The number of the sliders 3 may be increased as desired and with it the safety against an unauthorized opening of the lock. To facilitate their manipulation, the boltlike handles 6 have a square cross-section and are tapered toward the cover plate 1.

Each slider 3 is provived with a series of eleven superimposed holes 11 on the side which is remote from the cover plate 1. The holes 11 serve to receive pins (locking pins 12). A pin 12 is inserted only into one of the holes 11 of each slider 3. In no case must more than one pin 12 be inserted into a slider 3. The pins 12 are each provided at one end with a head 14, which may be provided with a slot to facilitate the screwing-in.

A slide plate 2 (FIGS. 3, 4 and 11) is mounted to be slidable transversely to the sliders 3 (arrow R in FIG. 3) and consequently to the pins 12. The guides for the slide plate 2 are not separately shown but it is within the capacity of a person skilled in the art to provide the plate 19 with ledges which overlie the longitudinal edges 39, 41 of the slide plate 2. The slide plate 2 might also be provided with slots, which are parallel to the longitudinal edges 39, 41 and receive bolts or sliding springs secured to the guide plate 19. The slide plate 2 has slide-plate openings 21 which are mutually parallel and provided in the same number as the sliders 3. In the embodiment shown by way of example, there are six apertures in the slide plate 2. Each slide-plate opening 21 has a notched longitudinal edge and a plain longitudinal edge 49. The pitch $t$ of the notches 22 (FIG. 11) is the same as the pitch $t'$ of the holes formed in the sliders 3 for the locking pins 12. The notches 22 are preferably semicircular and the diameter of the notches 22 agrees with the diameter of the locking pins 12. The slide plate 2 has a continuous slot 23, which extends transversely to the apertures 21 and through the lands 48 between the apertures 21. The pins 12 inserted into the sliders 3 extend through the plane of the slide plate 2 so that the latter can be displaced relative to the guide plate 2 in the direction of the double arrow R only when all pins 12 received by the sliders 3 are on the level of the slide-plate slot 23 of the slide plate 2. In the initial position of the sliders, shown in FIG. 3, this is not the case because all pins 12 lie below the transverse slot 23. To enable a displacement in the direction of the double arrow R (FIG. 3), the sliders 3 must be displaced in the direction of arrow Q. The sliders 3 and the individual slide plates 4 firmly connected to them will be designated I, II, III, IV, V, VI, in this succession. To move the pin 12, which has been inserted in the slider I, to the level of the transverse slot, slider I must be displaced in the direction of the arrow Q by a distance $4t'$, slider II by a distance of $10t'$, slider III by a distance of $t'$, slider IV by a distance of $8t'$, slider V by a distance $5t'$ and slider VI by a distance $3t'$. When the safety lock has been mounted on the door 8, the boltlike handles 6 may be operated to displace the sliders 3. The extent of the displacement must be checked by reference to the number of graduations 10 on the baseplate 1. The pitch $t'''$ of the graduations 10 is the same as the pitch $t'$ of the holes 11 for receiving the pins 12 in the sliders 3. The slot 9 shown on the left in FIG. 5 is associated with the slider I. To displace the pins 12 of all sliders I–VI to the level of the transverse slot 23 of the slide plate 2, the boltlike handles 6 must be set in succession, beginning on the left in FIG. 5, to the digits 401, 853. When this setting has been performed, the slide plate 2 may be displaced relative to the guide plate 19 by a displacement of the actuating handle 76 in the direction of arrow S. The guide plate 19 is provided with pins 24 (FIGS. 3, 4), which engage the transverse slot 23 of the slide plate 2 and provide an additional guidance for the slide plate 2.

Figure 3:
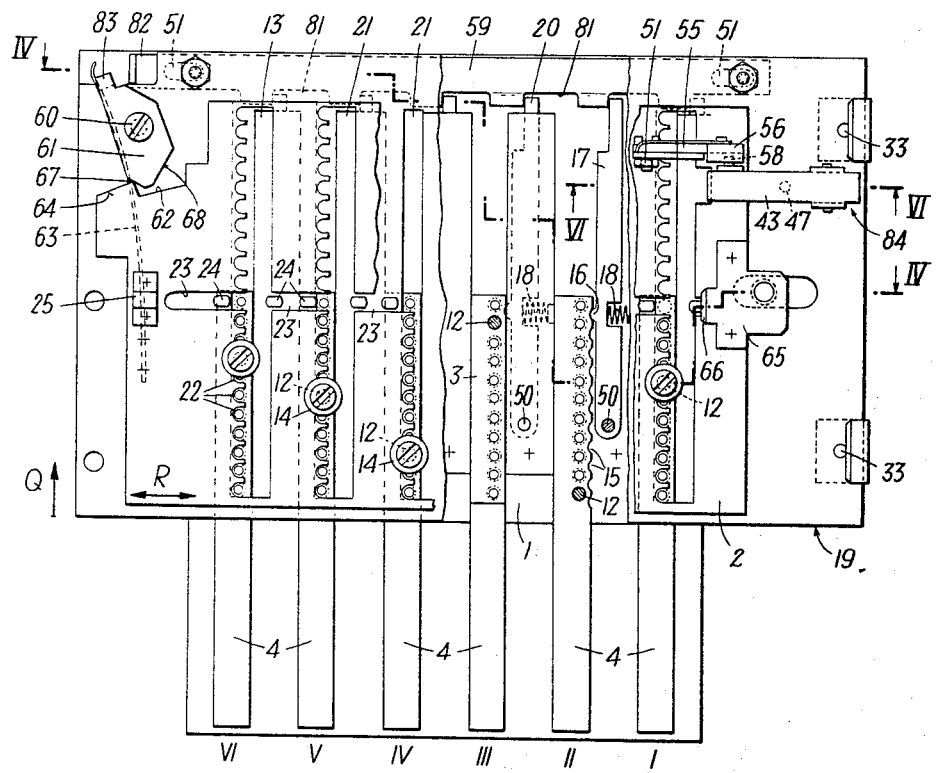
FIG. 3 is an elevation showing the lock according to the invention, with the cover removed, viewed from the inside of the room to be closed by the door.
Figure 4:
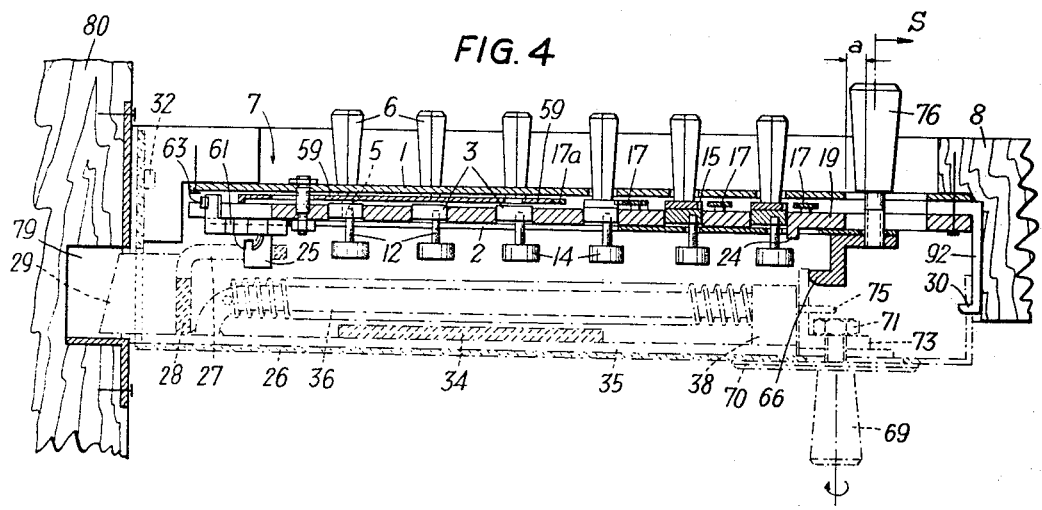
FIG. 4 is a sectional view taken on line IV—IV of FIG. 3, with dash-dot lines showing the cover and the means for actuating the bolt of the lock.

A driver 25 is fixed to the slide plate 2 (FIGS. 3, 4, 11, 12). As is shown in FIG. 4, this driver engages one end of a slot 27, which extends parallel to the direction of displacement of the slide plate 2 and is formed in an angle member 28. The angle member 28 is firmly connected to the bolt 29. A displacement of the actuating handle 76 in the direction of the arrow S will thus displace also the bolt 29 in the direction of the path represented by arrow S and the bolt is thus disengaged from the recess 79 in the doorpost 80. The door 8 can now be opened.

Superimposed detent notches 15 are provided at the edge of each slider 3 and of each individual slide plate 4 and correspond in number to the holes 11 for the pins 12. A detent lever 17 is associated with each slider 3 and is formed with a detent tooth 16, which is engageable with the detent notches 15 of the adjacent slider 3 or of the adjacent face plate 4.

When a boltlike handle 6 is operated to move one of the sliders 3 from its initial position, shown in FIG. 3, the detent tooth 16 associated with said slider will engage a detent notch 15 of the detent lever 17 to hold the slider 3 in the set position. The detent levers 17 are pivoted on pins 50, which are fixed in the guide plate 19. The detent levers 17 are biased by springs 18, which tend to move the detent lever 17 against the associated slider 3 or face plate 4.

Each detent lever 17 is provided with an extension 20 at its end remote from the pivot pin 50. The ends of the extensions 20 engage notches 81 formed in a bar 59 for releasing the detent lever 17. The release bar 59 is formed with slots 51, which receive pins 31, which are firmly connected to the guide plate 19 and the cover plate 1 (FIGS. 13, 15). The release bar 59 has at one end an actuating extension 82. When a force in the direction of the arrow T in FIGS. 13 and 15 is exerted on the actuating extension 82, the detent levers 17 will be pivotally moved in the clockwise sense and the detent teeth 16, will be disengaged from the detent notches of the sliders 3 or of the face plates 4. This is distinctly apparent from FIG. 13. A displacement of the release bar 59 in the direction of the arrow T causes the extensions 20 to engage the lands between the notches 81 so that the extensions are moved along by the release bar 59 in the direction of the arrow T and pivotally moved in the clockwise sense.

For the operation of the release bar 59, a control finger 61 is provided, which is pivoted on a pin 60, which is fixed on the guide plate 19. The finger 61 is under the influence of a spring 63, which tends to impart to the control finger 61 a movement in the clockwise sense and to engage an extension 83 of the control finger 61 with the actuating extension 82 of the release bar 59. The control finger 61 is operated by an edge 64 of the slide plate 2. The edge 64 is inclined from the direction of displacement of the slide plate 2. The control finger 61 has a V-shaped end, which is opposite to the extension 83. The edge 64 of the slide plate 2 is connected by a step to a recess 62 in the edge of the slide plate 2. When the slide plate 2 is displaced to the right from the position shown in FIG. 3, the limb 67 of the V-shaped end of the control finger 61 engages the end of the edge 64 of the slide plate 2 and of the slide plate to the right causes a counterclockwise pivotal movement of that limb to disengage the same from the actuating extension 82 of the release bar 59. On the other hand, when the slide plate 2 is moved to the right from the position shown in FIG. 3 (by this movement, the lock is opened, as has been mentioned hereinbefore) and the slide plate is then returned to the left, the edge 68 of the V-shaped edge of the control finger 61 will engage the edge 64 and a continued movement of the slide plate 2 to the left will cause a pivotal movement of the control finger 61 in the clockwise sense so that the extension 83 engages the actuating extension 82 of the release bar 59. This bar is thus displaced in the direction of the arrow T and, as has been mentioned, the detent teeth 16 are disengaged from the detent notches 15 of the sliders 3 or of the individual slide plates 4. Under the action of gravity or of a spring, not shown, the sliders 3 can return to their initial position, in which the boltlike handles 6 engage the lower end of the slots 9 of the cover plate 1 (FIG. 5). When the slide plate 2 is in its left-hand dead-center position, which is attained when the slide plate 2 is displaced to the left by the distance $a$ from the position shown in FIG. 3, the V-shaped end of the control finger 61 engages the recess 62 in the edge of the slide plate 2; this recess adjoins the inclined edge 64 of the slide plate 2. It may be mentioned that the force of the spring 63 is not sufficient to displace the release bar in the direction of arrow T against the pressure of the spring 18. When the V-shaped end of the control finger 61 is disposed in the edge recess 62, the detent teeth 16 of the detent levers 17 are thus in engagement with the detent notches 15 of the sliders 3 or of their face plates 4. When the slide plate 2 is in its left-hand dead-center position, the sliders 3 are held by the detent teeth 16 of the detent levers 17 in the position to which they have been displaced by the actuation of the boltlike handles 6. When the slide plate 2 is in its left-hand dead-center position, the number 401,853 can be set by a displacement of the boltlike handles 6 in the slots 9 of the cover plate 1 and the door can then be opened by a displacement of the actuating handle 76 in the direction of the arrow S.

When a wrong combination of digits is set by the actuation of the boltlike handles 6 (in the present case a combination which differs from the number 401,853), at least one of the pins 12 is on a level which differs from the level of the transverse slot 23. If the actuating handle 76 is then displaced in the direction of the arrow S to displace the slide plate 2 from its left-hand center position by a distance $a$ (FIG. 4), the pin or pins 12 which is or are on a level differing from the level of the transverse slot 23 will engage the one of the notches of the slide plate 2 to prevent a further displacement of the slide plate 2 in the direction of the arrow S and consequently an opening of the lock.

Figure 8:
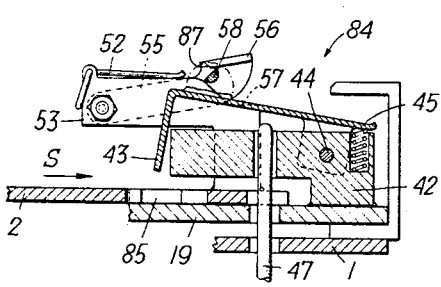
FIG. 8 shows the same detail as FIG. 6 with the parts in a different position as in FIG. 6.
Figure 9:
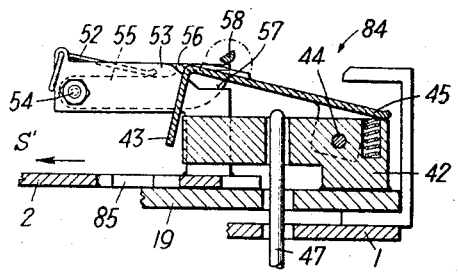
FIG. 9 shows the same detail as FIG. 8 in a different position as in FIGS. 6 and 8.

To prevent a movement of the slide plate 2 back to the left-hand dead-center position when a wrong setting has been made, i.e. a displacement of the slide plate 2 by the distance *a* from the position shown in FIGS. 3 and 4, a locking device generally designated 84 is provided. This locking device is shown as a detail in several views in FIGS. 6 to 9. This locking device comprises a hook 43, which is pivoted on a pin 44, which is fixed in an extension 42 of the guide plate 19. The hook 43 has an extension 45, which is engaged by a compression spring 46, which is disposed in a bore. The compression spring 46 tends to impart to the hook 43 a pivotal movement in a counter-clockwise sense and to urge the end of the hook against the slide plate 2. If the slide plate 2 has been displaced from its left-hand dead-center position by the distance *a* to the position shown in FIGS. 3, 4, and 6, the hook 43 has snapped into a recess 85 of the slide plate 2 to prevent a movement of the slide plate 2 in a direction opposite to the direction of arrow S. Such movement would be required, e.g., to enable a setting of the boltlike handles 6 to a wrong combination of digits. It has already been mentioned that a setting of a wrong combination of digits and a subsequent displacement of the slide plate 2 from its left-hand dead-center position (FIG. 3) by the distance *a* cause the pin 12 which is not on the level of slot 23, to engage one of the notches 22 of the slide plate 2 so that any movement of the respective slider 3 is blocked. A pin 47 is provided for unblocking the slide plate 2 for a movement opposite to the direction of the arrow S (FIG. 6). The pin 47 extends through a bore 86 of the extension 42 of the guide plate 19 and engages the underside of the hook 43. A displacement of the pin 47 in the direction of the arrow U causes a lifting of the hook 43 to disengage the same from the recess 85 in the slide plate 2. To enable an actuation of the pin 47, the same protrudes outwardly through a bore 88 in the plate 1. It is then possible to displace the plate 2 opposite to the direction of arrow S and to disengage the pins 12 which are not on the level of the transverse slot 23 from the notches 22 alongside the aperture 21 of the slide plate 2. The boltlike handles 6 may then be operated again to displace the sliders 3 to a different position because the displacement of the plate 2 opposite to the arrow S has caused the control finger 61 to displace the release bar 59 in the direction of arrow T so that the detent levers 17 have been pivotally moved and the detent teeth 16 have been disengaged from the sliders 3 or face plates 4. The pin 47 is suitably coupled to an audible or visual signalling device so that a signal is generated whenever the pin 47 is actuated and any attempt of an unauthorized person to find the correct combination of digits by trial and error will be indicated. Beside the extension 42, an arm 53 which extends parallel to the slide pltae 2 is fixed to the latter. A one-armed lever 55 is pivoted to the arm 53 by a pin 54 and is pivotally movable against the pressure of a spring 52. At its end remote from the pin 54, the one-armed lever is provided with a lug 56, which is directed toward the arm 54 and overlies the edge 57 remote from the slide plate 2. The edge 57 is angled and has a portion that is inclined from the slide plate 2. A driver pin 58 is firmly connected to the hook 43 and extends toward the arm 53, which is connected to the slide plate 2. When the slide plate 2 is displaced in the direction of arrow S to open the lock, the driver pin 58 will enter the gap between the arm 53 and the lug 56 of the one-armed lever. When the slide plate 2 is displaced by a distance larger than *a* from its left-hand dead-center position, the pin 58 will engage that portion of the edge 57 of arm 53 which is inclined from the slide plate 2 so that the hook 43 is pivotally moved away from the slide plate 2 and out of the recess 85 of the slide plate 2 (FIG. 8). By a continued movement of the slide plate 2 in the direction of arrow S, the end 87 of the lug 56 is moved past the driver pin 58 of the hook 43 and the one-armed lever 55 is pivotally moved so that the spring 52 imparts a clockwise pivotal movement to the one-armed lever 55 and the top of lug 56 assumes a position on an imaginary line which is an extension of the upper edge of arm 53. When the lock has been opened and the slide plate 2 is moved in the direction of arrow S' towards its left-hand dead-center postion (shown in FIG. 3), the driver pin 58 will slide along the top of lug 56 (FIG. 9) and will thus be held clear of the slide plate 2 so that the hook 43 cannot engage the recess 85 of the slide plate and does not prevent the movement of the slide plate to its left-hand dead-center position. The one-armed lever 55 forms thus a spring-biased deflector for controlling the hook 43 in dependence on the movement of the slide plate 2.

Figure 17:
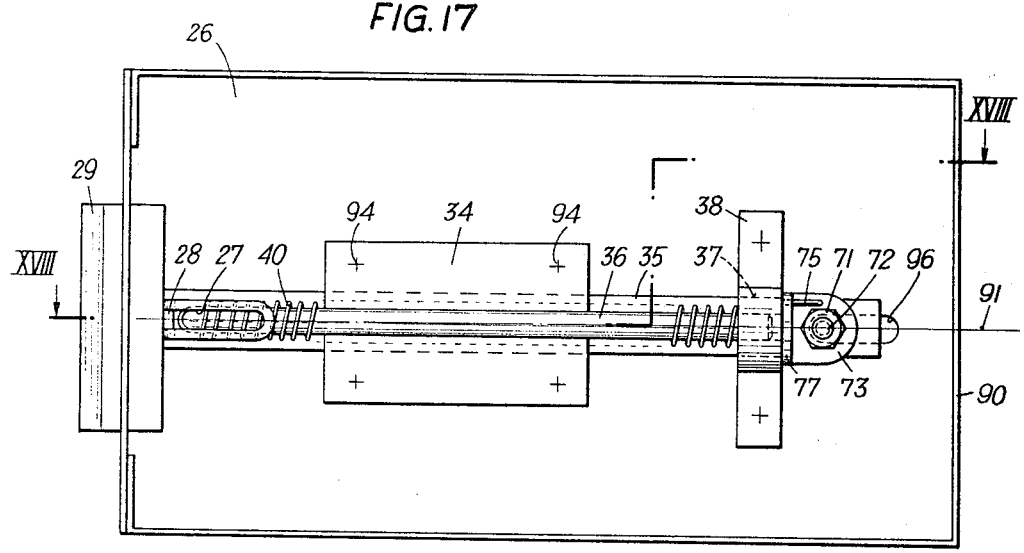
FIG. 17 shows in elevation the inside of the housing.
Figure 18:
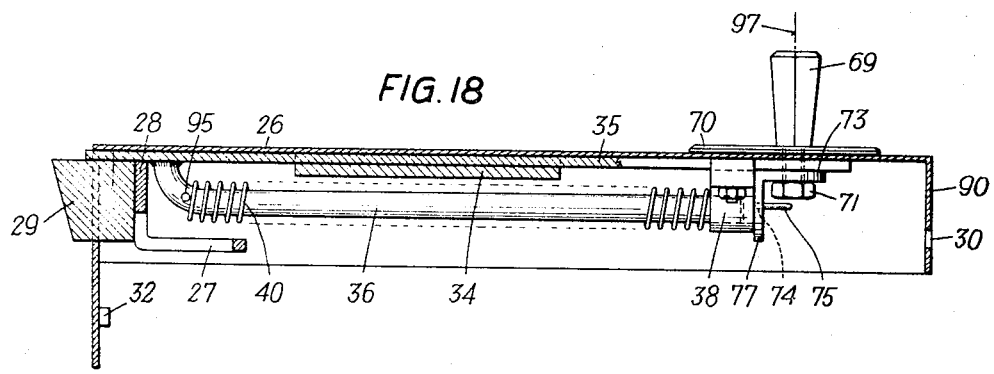
FIG. 18 is a sectional view taken on line XVIII—XVIII of FIG. 17.

FIGS. 17 and 18 show more in detail the housing 26, which is indicated in dash-dot lines in FIG. 4. The wall 90 of the boxlike housing 26 has two elongated apertures 30, which are symmetrical to the longitudinal center line 91 of the housing 26. If the housing 26 is mounted on the safety lock, retaining hooks 92, which are fixed to the guide plate 19, extend through the apertures 30 of the housing 26 (FIG. 4). On its wall 93, which is opposite to the wall 90, the housing 26 is provided with pins 32, which extend into the interior of the housing and are symmetrically disposed with respect to the longitudinal center line 91. When the housing 26 is mounted on the lock, these pins 32 enter corresponding apertures in the door 8. The hooks 92 and the pins 32 prevent a lifting of the housing 26, and of the bolt 29 slidably mounted in the housing, from the lock. Only when the door 8 is open can the housing be removed from the lock and from the door 8 by a displacement of the housing 26 in the direction of the longitudinal center line 91.

The bolt 29 is firmly connected to a sliding member 35, which is slidably mounted in a guide 34, which is fixed to the housing 26 by screws or by welding. A bolt member 36 extending in the direction of the longitudinal axis 91 of the housing is firmly connected to the slide member 35 and extends through a guide slot 37 in a guide member 38 secured to the housing 26. A compression spring 40 is fitted on the bolt member 36 and bears at one end on the guide member 38 and at the other end on a stop 95 of the bolt member 36. The spring 40 tends to move the bolt 29 out of the housing 26. An actuating handle 69 is slidably mounted in a longitudinal slot 96 of the housing 26 and is pivoted to the slide member 35. An angle member 73 disposed inside the housing 26 is firmly connected to the actuating handle 69 by a screw bolt 72 and a nut 71 and is pivotally moved in unison with a pivotal movement of the actuating handle 69 about its axis 97. One arm 77 of the angle member 73 has an aperture 74, which receives a pin 75, which extends parallel to the longitudinal center line 91 of the housing 26 and protrudes from the guide member 38. For this reason the actuating handle 69 cannot be pivotally moved about its axis 97 unless the arm 74 of the angle member 73 has disengaged the pin 75. A stop 66 is firmly connected to the slide plate 2 and in the position shown in FIG. 4 firmly engages the arm 77 of the angle member 73. The knob 69 can be actuated from the inside of the room to be closed by the door 8 can can be displaced only in unison with a displacement of the plate 35. When the angle member 73 is in the position shown in FIGS. 4 and 18, the door cannot be opened from the inside of the room unless the slide plate 2 can be displaced relative to the guide plate 19. This displacement of the slide plate 2 is not possible unless the required digit combination, in the present case the number 401,853 has been set. When the door has been opened, the handle 69 can be pivotally moved through 90° so that the angle member 73 can also be pivotally moved through 90° and the arm 74 of the angle member 73 engages no longer the stop 66, which is connected to the slide plate 2. In this case the handle 69 can be actuated from the inside of the room to displace the bolt 29 in the direction of the longitudinal axis 91 of the housing 26 without moving the slide plate 2 in unison with this movement. In this case the door can be opened from the inside of the room without a need for setting a certain combination of digits before the opening of the door. When it is desired to prevent an opening of the door 8 from the inside, it is sufficient to set from the the outside the correct combination of digits and to displace the actuating handle 76 and with it the slide plate 2 in the direction of the arrow S. During this displacement, the driver 25 moves the bolt 29 and the slide member 35 moves the handle 69 to the open position. In the latter position, the handle 69 is pivotally moved through 90° so that the stop 66 engages the arm 74 of the angle member and the handle 69 can now be displaced only in unison with the slide plate 2, as has been explained hereinbefore.

The safety lock has substantially the following mode of operation:

When the door is to be opened from the outside, the bolt-like handles 6 are used to move the sliders 3 upwardly in accordance with the digit combination which has been selected and set (401,853). For this purpose, each handle 6 is moved to the digit associated with it. The detent teeth 16 of the detent levers 17 and the springs 18 cooperate to releasably hold the sliders 3 in their set position so that the sliders 3 cannot drop out of engagement automatically. The actuating handle 76 on the outside of the door 8 and with it the slide plate 2 are then displaced in the direction of arrow S from left to right in FIGS. 3 and 4.

By the upward displacement of the sliders, the pins 12 thereof have been moved before the slots 23 of the slide plate 2. During the above-mentioned displacement of the plate 2, the pins 12 enter the slots 23 until the hook 43 has performed an unlocking movement about the lug 56 in the clockwise sense in FIG. 6 because the driver pin 58 engages the inclined edge of arm 53 to impart to the hook 43 an unlocking movement about the lug 56 in the clockwise sense in FIG. 6 and the plate 2 is then displaced to the end of its range. This displacement is just sufficient to retract the bolt 29 entirely into the frame of the housing 26 (FIGS. 17 and 18). When the door is open and the handle 76 is released, the spring 40 restores the slide plate 2 coupled to the bolt to its initial position and causes the levers 17 to disengage the sliders 3 (in the last phase of the movement of the plate) so that the sliders 3 and the boltlike handles 6 slide back to their initial, lower position (FIG. 5).

A particular advantage of the lock according to the invention resides in that the digit combination which must be set with the boltlike handles 6 to enable the lock to be opened can be changed at any time when the housing 26 has been removed. To change the combination, it is sufficient to change the positions of the pins 12 in the sliders 3. It is thus possible to prevent an opening of the lock by persons who know the present digit combination required to open the lock when such persons should be barred from the room to be closed by the lock.

What is claimed is:
1. A combination-type safety lock comprising:
   a cover plate provided with a plurality of mutually parallel-spaced elongated apertures with a series of marks spaced along each of said apertures;
   a slide plate substantially parallel to said cover pltae but spaced therefrom and formed with a plurality of elongated slide-plate openings extending parallel to said apertures and respectively associated therewith, with lands between said slide-plate openings, and with a slide-plate slot extending transversely of said slide-plate openings and intersecting same;
   a guide plate disposed between said cover plate and said slide plate while extending parallel thereto and being fixedly positioned relative to said cover plate, said guide plate being provided with a plurality of mutually parallel guide slots each associated with a respective one of said apertures and a respective one of said slide-plate openings while being substantially parallel thereto;
   a respective slider slidably mounted in each of said guide slots;
   a respective setting handle carried by each of said sliders and extending therefrom through a respective one of said apertures, each of said sliders being formed along a side thereof remote from said cover plate with a series of holes spaced correspondingly to the marks along the respective aperture;
   a plurality of setting pins each received in a single hole of the respective series of holes of the respective slider and extending through the slide-plate opening associated with that slider;
   a bolt guide defining a path extending parallel to said slide-plate slot;
   a bolt slidably mounted on said bolt guide for movement along said path; and
   coupling means operatively connecting said slide plate to said bolt for displacement of the latter along said path, each of said sliders being shiftable along said guide slots in said guide plate to a respective unlocking position in which the respective setting pin of the slider extends into said slide-plate slot, said slide plate being shiftable relatively to said guide plate parallel to said guide-plate slot when, and only when, all said sliders are in their respective unlocking positions.

2. A safety lock as defined in claim 1 wherein each of said slide-plate openings has a longitudinal edge formed with a number of notches equal to twice the number of marks of the corresponding series of marks, each of said notches being adapted to receive one of said setting pins.

3. A safety lock as defined in claim 1 wherein each of said sliders is elongated and is formed along a respective longitudinal side with a series of notches, said sliders being each associated with a respective detent lever having a detent tooth engageable with any of the notches of the respective slider, said lock further comprising spring means tending to urge each of said detent levers into engagement with one of said notches to releasably retain each of the respective sliders against movement.

4. A safety lock as defined in claim 3 wherein each of said detent levers is formed with an extension parallel to the respective guide slot, said lock further comprising a bar guide parallel to said slide-plate slot, a release bar slidably mounted in said bar guide and formed with release-bar notches engageable by said extensions, said slide plate being shiftable relatively to said guide plate in bolt-retracting and bolt-extending directions, and a control finger co-operating with said bar to disengage said detent teeth from said notches of said sliders, thereby releasing said sliders upon movement of said slide plate in bolt-extending direction, said sliders being constructed and arranged to move automatically into a locking position in which said setting pins are outside said slide-plate slot when said sliders are released by said control finger.

5. A safety lock as defined in claim 1 wherein said slide plate is displaceable in a bolt-extending and a bolt-retracting direction and is formed with a recess, said lock further comprising a hook mounted on said guide plate and engageable in said recess to retain said slide plate upon movement thereof in said bolt-retracting direction through a predetermined distance, thereby preventing return of said slide plate in said bolt-extending direction, spring means biasing said hook toward said slide plate, an arm fixed to said slide plate and having a camming edge inclined with respect thereto, a driver pin fixed to said hook and slidably engageable by said camming edge during movement of said slide plate in said bolt-retracting direction to disengage said hook from said recess, a lever pivotally mounted on said arm and having a free end remote from its pivotal axis formed with a lug overlying said camming edge, a spring tending to move said lug toward said camming edge into a position in which the lug prevents engagement of said driver pin with a portion of said camming edge and engagement of said hook in said recess of said slide plate during movement thereof in said bolt-extending position.

6. A combination-type safety lock as defined in claim 5 for use with a triggerable alarm, said lock further comprising a release pin operable to lift said hook from said recess and permit return of said slide plate in said bolt-extending direction and connectable with the alarm for triggering same upon opertaion of said release pin, and further spring means tending to displace said slide plate and said bolt in said bolt-extending direction, each of said slide-plate openings having a longitudinal edge formed with a plurality of notches adapted to receive a corresponding setting pin of the respective slider in the position of the slider plate in which said hook engages said recess, said spring means tending to release said pins from the notches engaged thereby with movement of said slide plate and said bolt in said bolt-extending direction.

7. A safety lock as defined in claim 1, further comprising a box-like housing forming an enclosure for said lock and provided with a cover provided with said bolt guide, and retaining members carried by said guide plate and engageable with said cover to hold the latter in position.

8. A safety lock as defined in claim 7, further comprising guide means fixed to said housing cover and disposed along an interior side thereof, a sliding member slidably mounted in said guide means, a rotatable actuating handle connected to said sliding member, said cover being provided with a cover slot extending in the direction of said slide-plate slot, said rotatable actuating handle extending through said cover slot, an angle member having a free arm connected to said rotatable actuating handle inside said enclosure and pivotally movable upon rotational movement of said actuating handle to a coupling position in which said free arm is at right angles to said slide-plate slot, a stop fixed to said slide plate and engageable by said free arm in said coupling position whereby said actuating angle and said bolt are displaceable only in unison with said slide plate in said coupling position of said angle member.

9. A safety lock as defined in claim 8, further comprising a guide pin in said enclosure, said free arm extending in the direction of said slide-plate slot and having an aperture receiving said guide pin whereby said free arm is displaced thereby during part of the movement in said bolt.

10. A safety lock as defined in claim 9 wherein said angle member is movable into an uncoupling position in which said guide pin is disengaged from said free arm, said actuating handle being rotatable in said uncoupling position of said angle member to rotate said free arm through 90° into a position in which the free arm is disposed in a plane parallel to said slide-plate slot and outside the path of said stop thereby enabling said actuating handle to shift said bolt without movement of said slide plate.

References Cited

UNITED STATES PATENTS

| | | | |
|---|---|---|---|
| 937,286 | 10/1909 | Croswell | 70—298 |
| 1,050,719 | 1/1913 | Brown | 70—298 |
| 2,822,683 | 2/1958 | Kahn | 70—288 |
| 3,115,028 | 12/1963 | Windle | 70—288 |

MARVIN A. CHAMPION, *Primary Examiner.*

R. L. WOLFE, *Assistant Examiner.*